United States Patent [19]
Phillips

[11] Patent Number: 6,125,717
[45] Date of Patent: Oct. 3, 2000

[54] CLOSE-CONNECTED SHAFT ADAPTER ASSEMBLY, JACK SHAFT ASSEMBLY, AND POWER TRANSMISSION ASSEMBLY USING SAME

[75] Inventor: Allyn E. Phillips, Salem, S.C.

[73] Assignee: Reliance Electric Technologies, LLC, Thousand Oaks, Calif.

[21] Appl. No.: 09/351,209

[22] Filed: Jul. 12, 1999

Related U.S. Application Data

[62] Division of application No. 08/891,023, Jul. 10, 1997, Pat. No. 5,934,156.

[51] Int. Cl.[7] .................................................. F16H 57/02
[52] U.S. Cl. .......................... 74/606 R; 74/467; 403/260
[58] Field of Search ................................. 74/606 R, 467, 74/421 A; 403/260; D15/149, 7, 148

[56] References Cited

U.S. PATENT DOCUMENTS

| | | | |
|---|---|---|---|
| D. 368,919 | 4/1996 | Lannoch | D15/148 |
| D. 377,657 | 1/1997 | Winters | D15/149 |
| D. 403,004 | 12/1998 | Kaye | D15/149 |
| D. 406,596 | 4/1996 | Ziegler et al. | D15/148 |
| 2,543,482 | 2/1951 | Williams | 74/606 R X |
| 3,162,061 | 12/1964 | Belezos | 74/606 R |
| 3,234,808 | 2/1966 | Nelson | 74/606 R X |
| 3,395,594 | 8/1968 | Blair | 74/606 R |
| 3,434,366 | 3/1969 | Raso et al. | 74/421 A |
| 3,813,956 | 6/1974 | Wihitecar | 74/606 R X |
| 4,037,429 | 7/1977 | Britzius | 74/606 R X |
| 4,111,069 | 9/1978 | Blair et al. | 74/606 R |
| 4,185,514 | 1/1980 | Edwards | 74/421 A |
| 4,641,547 | 2/1987 | Stich et al. | 74/606 R |
| 4,811,616 | 3/1989 | Henderson | 403/260 |
| 5,107,718 | 4/1992 | Inagawa | 74/467 |
| 5,220,852 | 6/1993 | Shinoda et al. | 74/606 R |
| 5,267,488 | 12/1993 | Hardeman et al. | 74/606 R |

FOREIGN PATENT DOCUMENTS

| | | | |
|---|---|---|---|
| 0567048 A1 | 10/1993 | European Pat. Off. | 74/606 R |
| 2245113 | 4/1975 | France | 74/606 R |
| WO 94/20774 | 9/1994 | WIPO | 74/606 R |

Primary Examiner—Vinh T. Luong
Attorney, Agent, or Firm—Patrick S. Yoder; John J. Horn; William R. Walbrun

[57] ABSTRACT

An adapter assembly for rotationally joining a first rotational member to a second rotational member is provided including a first adapter, a first bearing within the first adapter, a second adapter, a second bearing within the second adapter, and a connecting assembly. A power transmission assembly is provided, suitable for use with any one of a family of motors of different sizes, the assembly including a motor selected from the family, a speed reducer, a first adapter, a first bearing, a second adapter, a second bearing, and a connecting assembly. The first adapter is sized for use with at least two of the motors, and the first bearing is chosen from a family of bearings of different sizes, each sized for use with a corresponding one of the motors within the family. The first bearing is sized for use with the motor. Another power transmission assembly is provided suitable for use with any one of a family of speed reducers in which a second adapter and second bearing are selected, the second bearing being sized for use with the speed reducer.

20 Claims, 4 Drawing Sheets

CLOSE-CONNECTED SHAFT ADAPTER ASSEMBLY, JACK SHAFT ASSEMBLY, AND POWER TRANSMISSION ASSEMBLY USING SAME

This application is a divisional of application Ser. No. 08/891,023 filed Jul. 10, 1997 now U.S. Pat. No. 5,934,156 issued on Aug. 10, 1999.

BACKGROUND OF THE INVENTION

The present invention relates generally to an adapter assembly for joining two rotatable members and a related power transmission assembly. In particular, the present invention relates to an adapter assembly for closely joining an output shaft of a motor with an input shaft of a speed reducer.

Speed reducers of various types are known for converting output speeds and torques of prime movers such as motors to desired speeds and torques for an intended application, such as driving conveyors, rotating machinery, and the like. Generally, such speed reducers include one or more intermeshing gear sets arranged on a series of shafts between an input and an output. The input is designed to be connected to the prime mover, while the output, typically a keyed shaft or sleeve, is connected to the machine application to be driven. Multiple gear sets may be employed for further reduction of speed beyond the limits of a single gear set. For example, two-stage and three-stage speed reducers are commonly employed. A three-stage reducer may be created by combining a base reduction gear set within one housing with a modular additional reduction gear set within an additional housing secured to the main housing. Typically, two reduction gear sets are provided in the base reducer and a third reduction gear set is provided in the additional reducer, although all three gear sets can be included in the base reducer.

Motors of various constructions are also known for providing output rotation. Typically, output is provided by a shaft extending from a substantially flat end of a motor. One conventional form of electric motor interface includes a so-called "C-face" electric motor frame having a machine interface surrounding the electric motor output shaft. Other electric motor interfaces include the IEC B5 or IEC B14 flanges. The machine interface is designed to be coupled directly to a supporting flange, such as extending from a gear reducer or other device, or from an adapter joined to the reducer or device.

Various constructions are known for joining the output of the motor shaft with the input to the reducer shaft. Because of the various different types of motors having different frame sizes and power ratings and the different types and configurations of speed reducers used, numerous configurations of adapter assemblies for joining the motors and reducers are required. Thus, a problem in structuring speed reducers of the type mentioned above resides in interfacing the speed reducer input shaft with the electric motor. It is generally known in the art of speed reducer mechanical interfaces to provide an adapting shroud or flange which is bolted directly to the electric motor C-face and surrounds a coupling interfacing the electric motor output shaft to the reducer input shaft. This form of interface has the advantage of facilitating mounting of the motor and reducer set for providing acceptable alignment between the motor and gear reducer shafts.

In one type of interface typically referred to as a "gear motor," an input pinion of the reducer is mounted directly to the motor shaft, such as by press-fitting or keying the pinion around the motor shaft. A short interface casting is attached to the reducer housing and the motor frame. The motor shaft-mounted pinion extends into the reducer and meshes with a corresponding gear to form the initial reduction gear set.

In another type of interface, an intermediate drive shaft assembly, or "jack shaft" assembly is provided between the reducer and the motor. This assembly includes a pair of bearings supported in the jack shaft assembly housing to support the jack shaft. The motor has two of its own bearings to support its own shaft within the motor housing. The jack shaft either may be coupled to the electric motor shaft on its input side or may receive the electric motor input shaft into a bore formed in an end of the jack shaft. The output side of the jack shaft supports a pinion for the first gear set.

While both types of interfaces provide adequate transmission capabilities for reducers, they are not without drawbacks. For example, the jack shaft transmission assembly solution can result in a large number of separate adapter housing castings and jack shafts needed to accommodate various shaft lengths, and motor frame and reducer housing sizes. In particular, because a single-piece adapter housing is commonly used for both supporting and spacing the motor and the reducer, and for supporting the jack shaft between the motor shaft and the input gear set to the reducer, the design must accommodate various gear set center distances, electric motor frame sizes, reducer frame sizes, and motor and reducer shaft sizes. Thus, a large number of separately cast adapter housings and jack shafts are typically required to provide the desired range of gear ratios and power ratings. Depending upon the number of motors within a family of motors and the number of reducers with a family of corresponding reducers, literally dozens of separate adapter housings and jack shafts may be required to join motors to all suitable reducers.

U.S. patent application Ser. No. 08/792,201, filed Jan. 31, 1997 and owned by Applicant's Assignee, now abandoned describes a system for reducing the number of different cast adapter assemblies required to join various motors and reducers through use of common sizing. The system is capable of accommodating a large variety of electric motor frame sizes and offers modularity through use of a jack shaft to interface with the first gear set of the gear reducer. The system permits reduction of the overall number of cast adapter housings, while offering the flexibility of the jack shaft input system.

The system operates well to significantly reduce the cost of manufacturing and inventorying the adapters. However, using adapters according to the system requires certain of the parts within the adapters to be sized to be able to handle the largest possible motor that may be used with the adapter. For example, the bearing located closest to the motor must be sized large enough to handle the largest (i.e., highest power rating) motor suitable for use with the largest speed reducer matable with the particular motor adapter. In some cases, the bearing is much larger and therefore more expensive than needed for the particular motor actually used. Similarly, jack shaft parts also may be sized larger than needed for particular applications to take into account the range of possible sizes of other components. Thus, the reduction in the number of adapters required provided by the common adapter system reduces material and inventory costs related to the adapters, but increases costs for other parts within the drive train which have to be sized larger than needed for some applications.

Regardless of whether the above adapter system is used, the drive train between the output shaft of a motor and the output of a two or three stage reducer may extend from several inches to several feet, depending on the size of the motor and the number of gear reductions used. Consequently, it is desirable in some applications to reduce the length of the power train along the axial direction of the output shaft.

OBJECTS AND SUMMARY OF THE INVENTION

It is a principle object of the present invention to provide an improved adapter assembly for rotationally joining a first rotational member to a second rotational member that can be readily adapted to various applications.

Another object of the present invention is to provide an adapter assembly having reduced axial length.

Still another object of the present invention is to provide an adapter assembly having fewer parts than conventional adapter assemblies.

Yet another object of the present invention is to provide an adapter assembly that is easier to assemble than currently available adapter assemblies.

Yet another object of the present invention is to provide an adapter assembly in which adapters may be used with multiple sizes of motors, yet which does not require over-sizing of parts.

To achieve these objects and, in accordance of the purpose of the invention, as embodied and broadly described herein, an adapter assembly for rotationally joining a first rotational member to a second rotational member is provided, the adapter assembly comprising a first adapter disposed about a portion of the first rotational member and a first bearing disposed within the first adapter, the first rotational member rotating within the first bearing. A second adapter is disposed about a portion of the second rotational member and secured to the first adapter, and a second bearing is disposed within the second adapter, the second rotational member rotating within the second bearing coaxial with the first rotational member. A connecting assembly connects the first and second rotational members.

Preferably, the adapter assembly further includes a sealing member disposed between the first and second bearings. Also, preferably the connecting assembly includes a bushing disposed about the first rotational member, a shank shaft secured to the second rotational member, and a coupling member secured to the bushing and the shank shaft.

In accordance with another aspect of the invention, an adapter assembly for rotationally joining a motor having an output shaft to a speed reducer having an input shaft is provided, the assembly comprising a first adapter secured to the motor and disposed about a portion of the output shaft and a first bearing disposed within the first adapter, the output shaft rotating within the first bearing. A second adapter is secured to the speed reducer and disposed about a portion of the input shaft and secured to the first adapter, and a second bearing is disposed within the second adapter, the input shaft rotating within the second bearing and coaxial with the output shaft. A connecting assembly connects the first and second rotational members.

Preferably, a sealing member is disposed within one of the first or second adapters between the second bearing and the motor. The first bearing is preferably disposed between the connecting assembly and the first adapter. Also, the connecting assembly is preferably disposed substantially within the second adapter. The second adapter preferably includes a flange having a radially extending outer surface, the first bearing being disposed between the outer surface and the motor. The input shaft preferably includes an end opposing the output shaft, the outer surface being disposed between the end and the motor. The output shaft preferably includes an end opposing the input shaft, the outer surface being disposed between the end and the motor.

In accordance with another aspect of the invention, an adapter assembly for supporting rotationally joined first and second rotational members is provided, the adapter assembly comprising a first adapter disposed about a portion of the first rotational member and a first bearing disposed within the first adapter, the first rotational member rotating within the first bearing. A second adapter is disposed about a portion of the second rotational member and secured to the first adapter, and a second bearing is disposed within the second adapter, the second rotational member rotating within the second bearing. A sealing member is disposed between the first and second bearings.

In accordance with another aspect of the invention, a power transmission assembly comprises a motor having an output shaft and a speed reducer having an input shaft. A first adapter is secured to the motor and disposed about a portion of the output shaft, and a first bearing is disposed within the first adapter, the output shaft rotating within the first bearing. A second adapter is secured to the speed reducer and disposed about a portion of the input shaft and secured to the first adapter, and a second bearing is disposed within the second adapter, the input shaft rotating within the second bearing and coaxial with the output shaft. A connecting assembly connects the input shaft and the output shaft.

In accordance with another aspect of the invention, a power transmission assembly is provided, suitable for use with any one of a family of motors of different sizes and any one of a family of speed reducers of different sizes, each of the speed reducers being suitable for use with at least two of the motors, the assembly comprising a motor selected from the family of motors and having an output shaft and a speed reducer selected from the family of speed reducers and having an input shaft, the speed reducer being suitable for use with the motor. A first adapter is secured to the motor and disposed about a portion of the output shaft. A first bearing is disposed within the first adapter, the output shaft rotating within the first bearing, the first bearing being chosen from a family of bearings of different sizes, each bearing in the family of bearings being sized for use with at least one of the motors within the family of motors, the first bearing being sized for use with the motor irrespective of the size of the speed reducer. A second adapter is secured to the speed reducer and disposed about a portion of the input shaft and secured to the first adapter. A second bearing is disposed within the second adapter, the input shaft rotating within the second bearing and coaxial with the output shaft. A connecting assembly connecting the input shaft and the output shaft.

In accordance with still another aspect of the present invention, a power transmission assembly is provided, suitable for use with any one of a family of motors of different sizes and any one of a family of speed reducers of different sizes, each of the speed reducers being suitable for use with at least two of the motors, the assembly comprising a motor selected from the family of motors and having an output shaft, and a speed reducer selected from the family of speed reducers and having an input shaft, the speed reducer being suitable for use with the motor. A jack shaft assembly joins the input shaft and the output shaft, the jack shaft assembly including a first portion secured to the output shaft and a second portion joined to the input shaft, the first and second portions being joined together. The first portion is chosen from a family of first portions of different sizes, each first portion within the family of first portions being sized for use with at least one of the motors within the family of motors, the first portion being sized for use with the motor irrespective of the size of the speed reducer.

In accordance with yet another aspect of the present invention, a power transmission assembly is provided, suitable for use with any one of a family of motors of different sizes and any one of a family of speed reducers of different sizes, each of the speed reducers being suitable for use with at least two of the motors, the assembly comprising a motor selected from the family of motors and having an output shaft, and a speed reducer selected from the family of speed reducers and having an input shaft, the speed reducer being suitable for use with the motor. A jack shaft assembly joins the input shaft and the output shaft, the jack shaft assembly including a first portion secured to the output shaft and a second portion secured to the input shaft, the first and second portions being joined together. The first portion is chosen from a family of first portions of different sizes, and the second portion is chosen from a family of second portions of different sizes, the first portion being sized for use with the motor and the second portion being sized for use with the speed reducer.

Additional objects and advantages of the invention will be set forth in part in the following description, or may be obvious from the description, or may be learned through the practice of the invention.

BRIEF DESCRIPTION OF THE DRAWINGS

The present invention will be more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
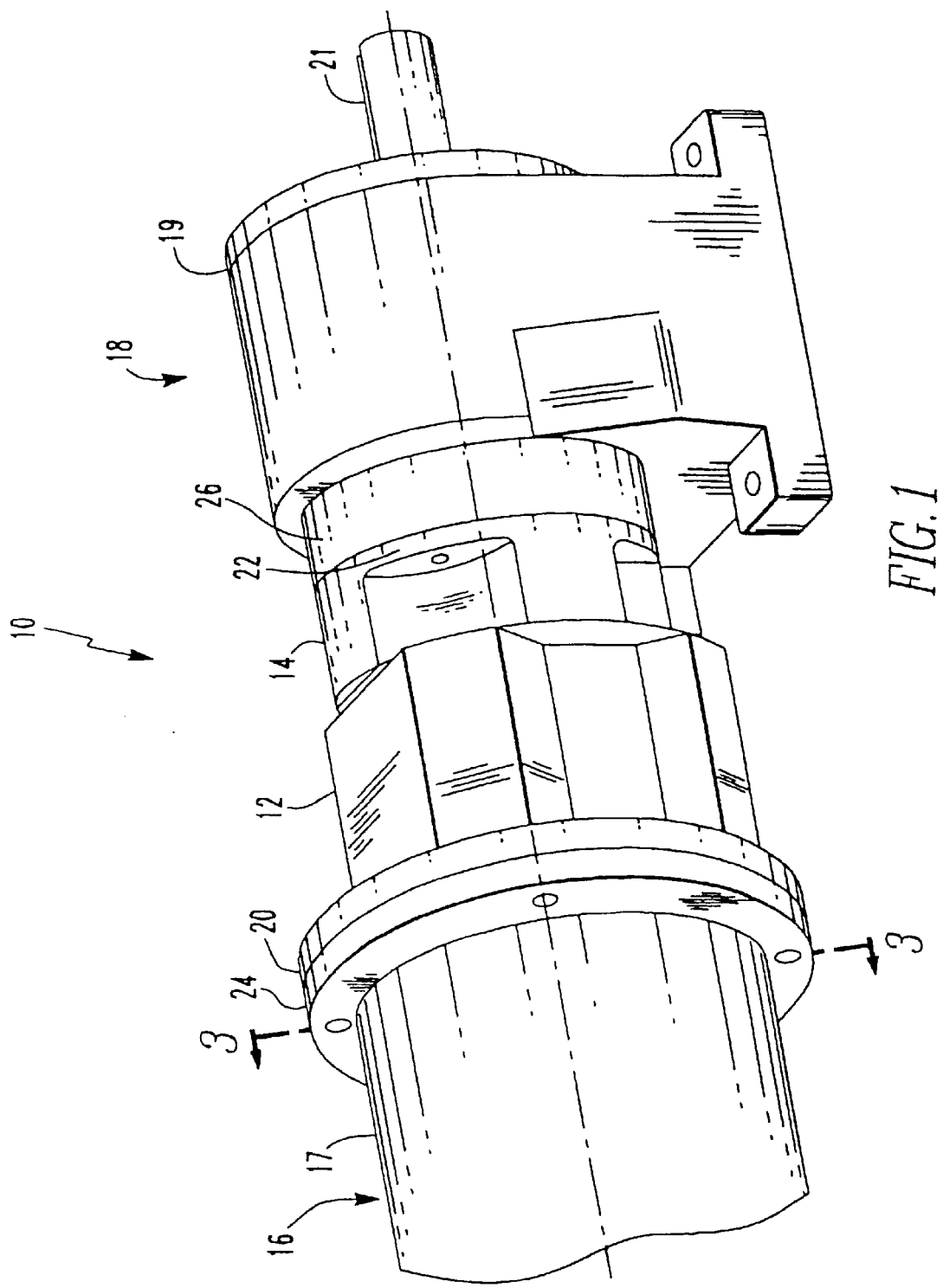
FIG. 1 is a perspective view of an adapter assembly disposed between a motor and speed reducer according to the present invention.

Reference will now be made in detail to the presently preferred embodiments of the invention, one or more examples of which are illustrated in the drawings. Each example is provided by way of explanation of the invention, and is not meant as a limitation of the invention. For example, features illustrated or described as part of one embodiment can be used on another embodiment to yield yet another embodiment. It is intended that the present invention include such modifications and variations.

As shown generally in FIG. 1, an adapter assembly 10 is depicted, and includes a first adapter 12 and a second adapter 14. The adapter assembly 10 couples a prime mover such as an electric motor 16 to a speed reducer 18. Motor 16 includes a motor housing 17, and gear reducer 18 includes a gear reducer housing 19. An output shaft 21 extends from reducer housing 19. As shown in FIG. 1, reducer 18 is a two-stage gear reducer, in which input rotation from a first shaft is transferred to a second shaft (not shown) and then to output shaft 21 by gearing, pinions, etc. (not shown). However, speed reducer 18 could be a three-stage gear reducer, or any other type of gear reducer, within the scope of the invention.

Figure 2:
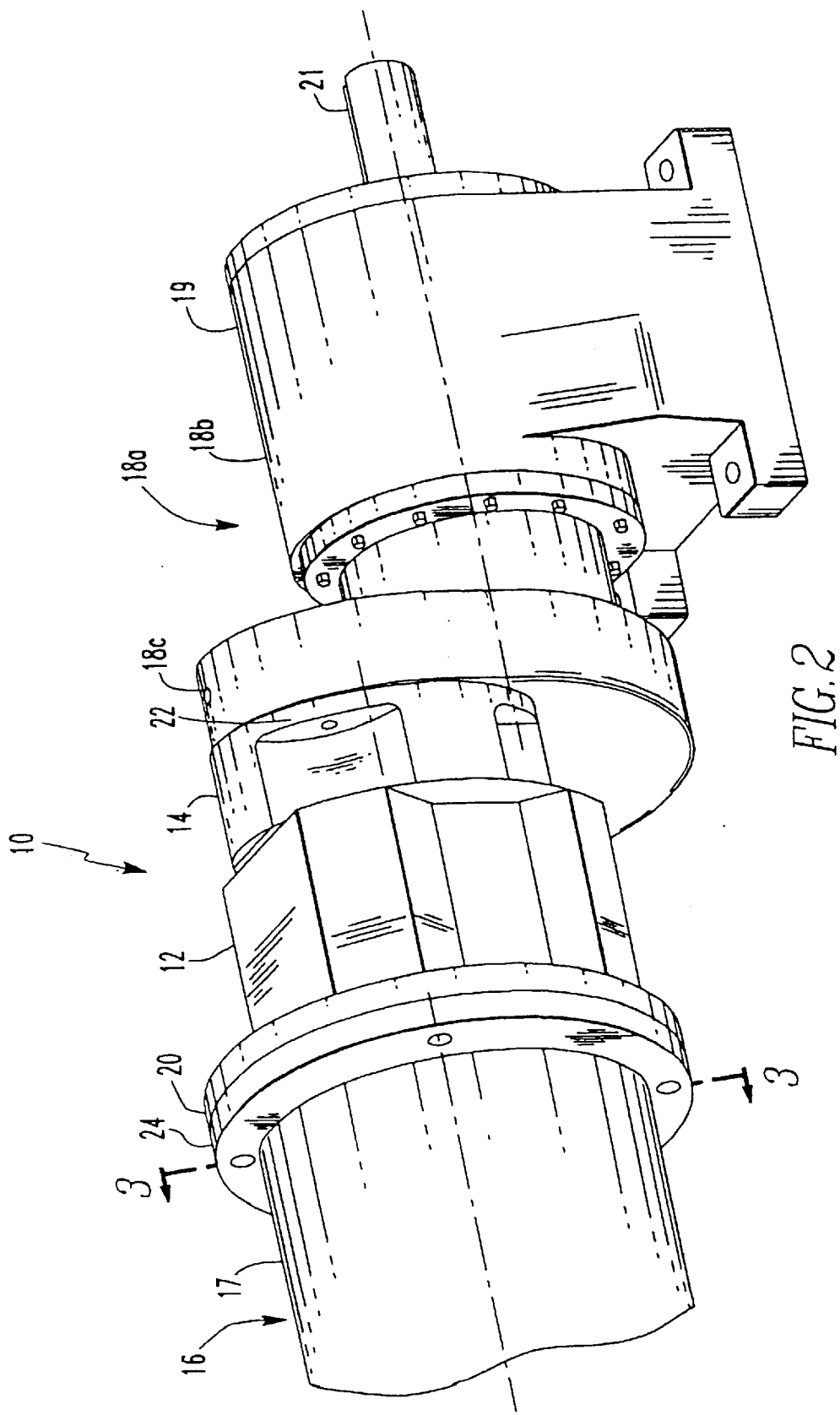
FIG. 2 is a perspective view of an adapter assembly disposed between a motor and three-stage reducer according to the present invention.

For example, FIG. 2 shows adapter assembly 10 secured to a reducer 18a which is a three-stage reducer. Reducer 18a includes a two-stage reducer 18b and a modular input one-stage reducer 18c attached to the input end of two-stage reducer 18b. The design and operation of first adapter 12 and second adapter 14 are substantially similar in the devices of FIG. 1 and FIG. 2. However, in FIG. 2, second adapter 14 attaches to input reducer 18c rather than to two-stage reducer 18b.

Figure 3:
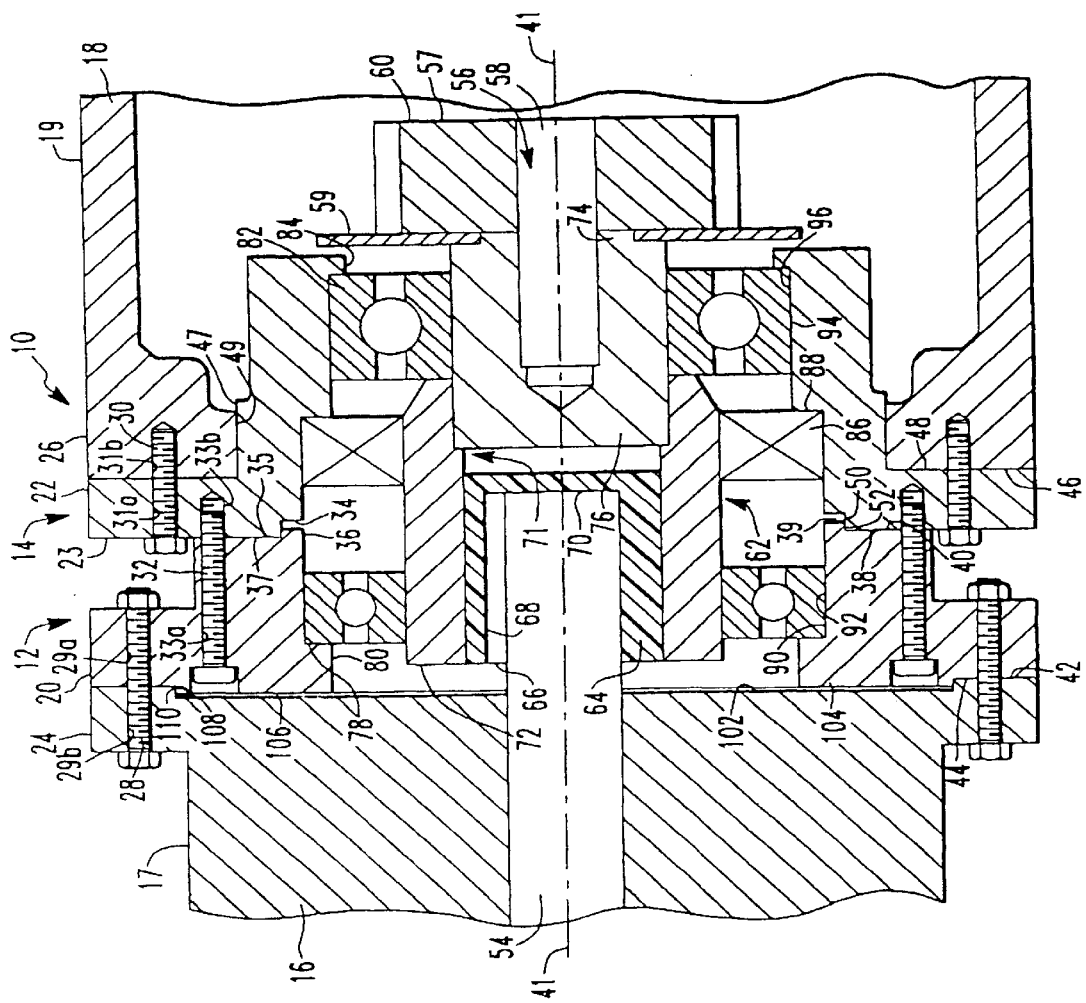
FIG. 3 is a sectional side view of the adapter assembly of either FIGS. 1 or 2, sectioned along lines 3—3 in those figures.
Figure 4:
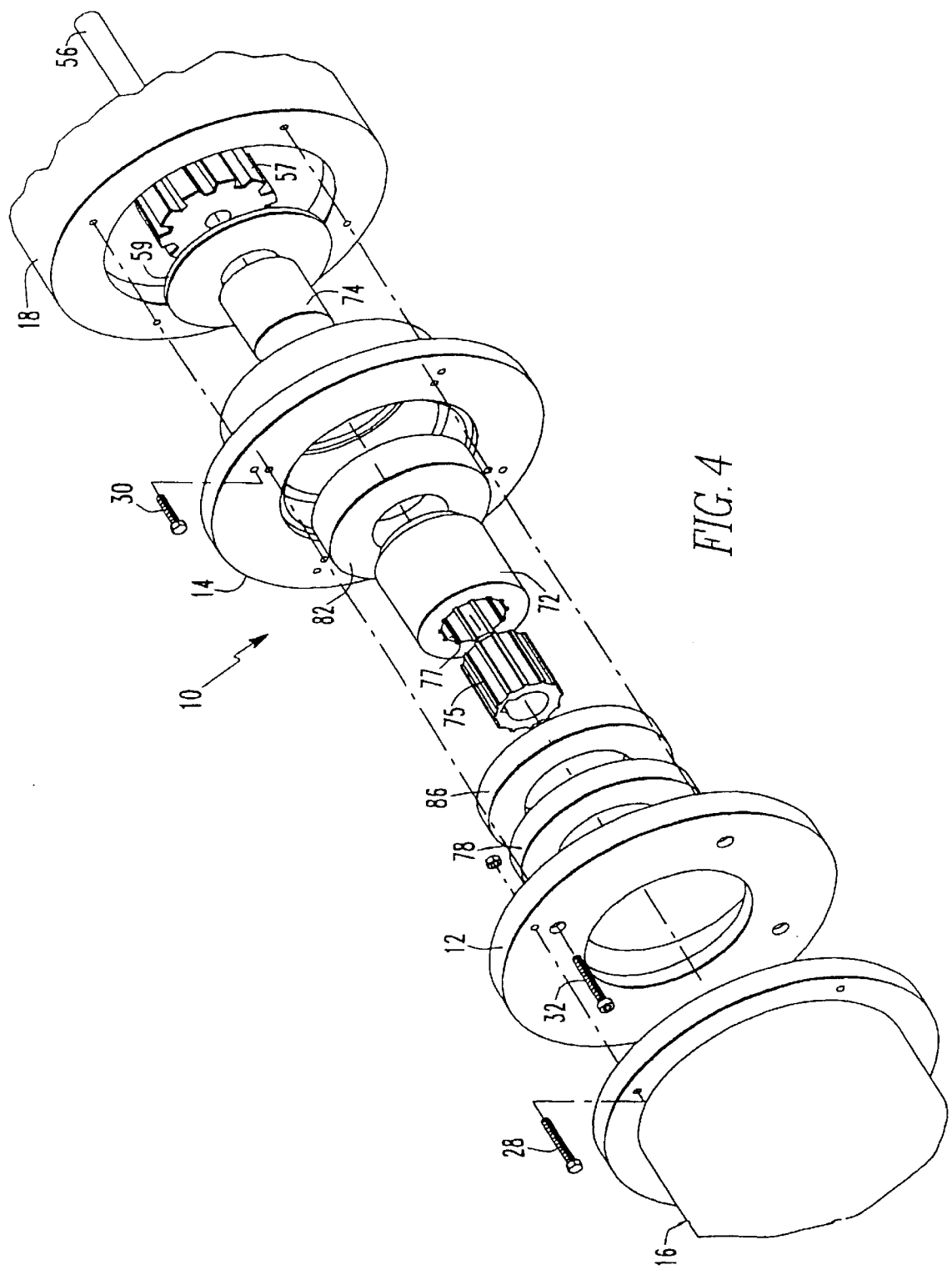
FIG. 4 is an exploded view of the adapter assembly of FIG. 3.

FIG. 3 is a sectional view of adapter assembly 10 taken along lines 3—3 in FIGS. 1 and 2. FIG. 4 is an exploded perspective view of adapter assembly 10. As shown in FIG. 3, adapter assembly lo is secured between motor 16 and reducer 18. Both first adapter 12 and second adapter 14 of adapter assembly 10 are substantially annular. First adapter flange 20 is secured to motor flange 24 of motor 16 by threaded members 28 extending through holes 29a and 29b in flanges 20 and 24, respectively. Second adapter flange 22 of second adapter 14 is secured to reducer flange 26 of reducer 18 by threaded members 30 extending through holes 31a and 31b in flanges 22 and 26, respectively. First adapter 12 is secured to second adapter 14 by threaded members 32 extending through holes 33a and 33b in adapters 12 and 14, respectively. Threaded member 32 may extend in the direction shown or in the opposite direction depending on the relative diameters of adapters 12 and 14. Each of threaded members 28, 30, and 32 may be screws, bolts, or any other suitable fasteners.

As shown in FIG. 3, an annular groove 34 is provided in an end 35 of second adapter 14 and an annular ridge 36 is provided in an end 37 of first adapter 12. Annular ridge 36 is sized to fit substantially within annular groove 34 to align first adapter 12 with second adapter 14. However, the locations of groove 34 and ridge 36 could be switched. Therefore, annular groove 34 could be disposed on first adapter 12 and annular ridge 36 could be disposed on second adapter 14 within the scope of the invention. Further, other mating shapes could be used on the adapter ends 35 and 37 in order to align the adapters 12 and 14, within the scope of the invention.

Preferably, as shown in FIG. 3, the height of annular ridge 36 is less than the depth of annular groove 34, providing a gap 39 therebetween, so as to provide a secure mating between first adapter 12 and second adapter 14. In order to ensure such a secure mating, it is important that surface 38 of first adapter 12 and surface 40 of adapter 14 be perpendicular to a central axis 41 of adapters 12 and 14. Also, surface 50 of first adapter 12 and surface 52 of second adapter 14 should be concentric around central axis 41. When adapters 12 and 14 are secured together, perpendicular surfaces 38 and 40 and concentric surfaces 50 and 52 thus align and form a seal between the adapters, and gap 39 ensures proper mating of perpendicular surfaces 38 and 40.

Similarly, mating perpendicular surfaces 42 and 44 are located respectively on motor flange 24 and first adapter flange 20, and perpendicular surfaces 46 and 48 are located respectively on reducer flange 26 and second adapter flange 22. These perpendicular surfaces provide for alignment and sealing when the motor and first adapter and the motor and second adapter are secured together.

Preferably, an annular groove 102 is provided in motor flange surface 42 for receiving an annular ridge 104 extending from first adapter surface 44. Groove 102 is deeper than ridge 104 leaving a gap 106 between the ridge and the bottom of the groove. Concentric surfaces 108 and 110 align motor 16 and first adapter 12 upon assembly. It should be understood that the locations of groove 102 and ridge 104 could be reversed. Concentric surfaces 47 and 49 similarly align second adapter 14 and reducer 18.

As shown in FIG. 3, a motor output shaft 54 extends into one side of adapter assembly 10 from motor 16, and a reducer input shaft comprising a pinion shank 56 extends into the other side of the adapter assembly from reducer 18. Shafts 54 and 56 are rotationally joined by portions of adapter assembly 10 described below. Motor output shaft 54 is thus a first rotational member that is secured to and rotates coaxially with reducer input shaft 56, which is thus a second rotational member. Reducer input shaft 56 may be part of a shank pinion 57 having an extending shaft portion (pinion shank) 58 and a gear portion 60. Parts 58 and 60 may either be integrally formed, or the gear 60 may be secured to the pinion shaft 58, for example by a keyed slot, press fit, etc.

According to the present invention, a connecting assembly is provided connecting the first and second rotational members. As shown in FIGS. 3 and 4, connecting assembly 62 connects motor output shaft 54 to reducer input shaft 56. Connecting assembly 62 preferably includes a bushing 64 disposed about an end 70 of motor output shaft 54. Bushing 64 is preferably secured to motor output shaft 54 by sliding a key slot 68 in bushing 64 over a raised key 66 in motor output shaft 54. The bushing can be constructed from a number of different substances but preferably from a non-metallic substance, such as Nylatron® moldable plastic, or some other moldable material.

Preferably, connecting assembly 62 further includes a jack shaft 71 including a first portion comprising a shank shaft 74 secured to reducer input shaft 56. Shank shaft 74 is coaxial about central axis 41 with motor output shaft 54 and reducer input shaft 56.

The jack shaft 71 of connecting assembly 62 preferably also includes a second portion comprising coupling member 72 secured to bushing 64 and shank shaft 74. Coupling member 72 may be integral with shank shaft 74, if desired, although manufacture of the parts separately and attaching them together will most likely be less complicated and expensive. If coupling member 72 and shank shaft 74 are separately manufactured and joined, they may be joined by using an interference fit, industrial adhesive, or friction welding. Coupling member 72 and shank shaft 74 are also coaxial around central axis 41. Coupling member 72 may be secured to bushing 64, for example, by intermeshing splines 75 and 77, respectively, in the outer surface of bushing 64 and the inner surface of coupling 72. The outer surface of bushing 64 may be tapered slightly to allow bushing 64 to be more readily slid into coupling member 72.

As shown in FIG. 3, a first bearing 78 is disposed within first adapter 12, mounted against a seat 80 in the adapter. Preferably, bearing 78 is a double-sealed ball bearing. Bearing 78 supports bushing 64, and coupling 6 member 72 for rotation within first adapter 12.

As shown in FIG. 3, a second bearing 82 is disposed within second adapter 14, and is mounted against seat 84 within the adapter. Bearing 82 is also preferably a double-sealed ball bearing. Second bearing 82 supports the joined shank shaft 74 and shank pinion 57 (reducer input shaft 56) for rotation within second adapter 14.

Preferably, as shown in FIG. 3, a sealing member 86 is disposed within second adapter 14 between bearings 78 and 82, although sealing member 86 could also be disposed within first adapter 12. Sealing member 86 prevents leakage from the inside of gear reducer 18 through bearings 78 and 82 to the motor shaft 54. Preferably, sealing member 86 is disposed between bearings 78 and 82, although it could be disposed between motor 16 and bearing 78. Sealing member 86 is mounted against seal seat 88 in adapter 14 and held in place by friction. Sealing member 86 is preferably a double-lip rubber-coated OD standard sized seal. An annular slinger plate 59 is mounted adjacent gear 60 to prevent splashing of lubricant from between the gears of reducer 18 into second adapter 14.

As described above with relation to the concentric and perpendicular flange and adapter surfaces, it is important that concentric surfaces be provided for mounting bearings 78 and 82. For example, the outer surface 90 of bearing 78 and the inner surface 92 of first adapter 12 should be concentric around central axis 41. Also, the outer surface 94 of bearing 82 and the inner surface 96 of second adapter 14 should also be concentric around central axis 41.

The above-described structure of FIG. 3 provides a number of advantages as compared to prior art devices. For example, placement of sealing member 86 between bearing 82 and motor 16 (rather than between bearing 82 and gear 60) allows for a reduction in the axial length (along central axis 41) of the entire adapter assembly 10, as the seal can be moved to a previously unused space between bearings 78 and 82 or between bearing 78 and motor 16. Further, such arrangement allows bearing 82 to be placed closer to gear 60 of shank pinion 57. This arrangement will allow second bearing 82 to be smaller than if seal 86 been placed between bearing 82 and gear 60, thereby saving space and cutting cost.

Placing first bearing 78 within first adapter 12, mounted to motor 16, rather than in second adapter 14 mounted to reducer 18, also allows the axial length of the entire adapter assembly 10 to be reduced by optimizing the sizing of bearing 78 to the motor power rating assigned to first adapter 12. Thus, the internal portions of adapter assembly 10 are not all located within second adapter 14, as in some prior art constructions. As shown in FIG. 3, connecting assembly 62 is disposed substantially within second adapter 14, but not entirely within second adapter 14. For example, as shown in FIG. 3, second adapter flange 22 has a radially extending outer surface 23, and first bearing 78 is disposed between outer surface 23 and motor 16. Also, outer surface 23 may be disposed between end 70 of motor output shaft 54 and motor 16. Further, input shaft 56 has an end 76 opposing motor output shaft 54, and the radially extending surface 23 may be disposed between end 76 of input shaft 56 and motor 16. This arrangement provides space savings in the axial direction.

The arrangement described above also provides the benefit of allowing for more efficient sizing of parts. For example, in a power transmission assembly suitable for use with any one of a family of motors of different sizes and any one of a family of speed reducers of different sizes, each of the speed reducers being suitable for use with at least two of the motors, wherein the motor is selected from the family and the speed reducer is selected from the family and is suitable for use with the motor, the bearing and jack shaft sizing may be optimized. Thus, bearing 78, chosen from a family of bearings each sized for use with at least one of the motors, can be sized for use with motor 16 irrespective of the size of speed reducer 18. Since each adapter 12 is sized to a motor frame size, and each frame may have one, two, or three power ratings, the bearing is sized to the adapter 12, and hence motor power. Otherwise, the bearing would have to be sized to the speed reducer size which may cover multiple motor frames. Thus, the first bearing 78 need not be over-engineered to be suitable for use with larger motors than it would actually be used for, or specifically sized for use with the largest motor suitable for use with the particular speed reducer chosen. The present invention therefore provides cost savings by allowing smaller parts to be used. Of course, if a smaller bearing is used, a larger coupling member 72 or shank shaft 74 may still be required in order to allow for proper rotation of connector assembly 62.

Similarly, the jack shaft 71 may be designed so that first portion 72 joined to motor shaft 54 is chosen from a family of different sizes and the second portion 74 joined to shank pinion 57 is chosen from a family of different sizes, each first portion being sized for use with at least one of the motors. If so, first portion 72 may be sized for use with motor 16 irrespective of the size of speed reducer 18. Also, second portion 74 may be sized for use with the speed reducer. Thus, a jack shaft 71 may be assembled from efficiently sized components.

The adapter assembly 10 according to the invention can be readily installed between a motor 16 and a reducer 18 as follows. First, shank shaft portions 72 and 74 are coupled, and bearing 82 is slipped over portion 74. The assembled portions 72 and 74 are then placed in second adapter 14, seating bearing 82 between portion 72 and seat 84. Slinger plate 59 and shank portion 57 are then attached to second portion 74. Seal 86 is then slid into second adapter 14 and seated against seat 88. Bearing 78 is slid over first portion 72, and adapters 12 and 14 are then bolted together. At this point, either the adapter assembly 12/14 is bolted to one of reducer 18 or motor 16, depending on whichever has the smaller flange radius, and then the assembly is bolted to the other of motor or reducer. Bushing 64 is placed on motor shaft 54 prior to attaching the adapter assembly 12/14.

It will be apparent to those skilled in the art that various modifications and variations can be made in the present invention without departing from the scope and spirit of the invention. It is intended that the present invention include such modifications and variations as come within the scope of the appended claims and their equivalents.

I claim:

1. A power transmission assembly system comprising:
   a motor having an output shaft;
   a first adapter secured to the motor and disposed about a portion of the output shaft, the first adapter being stationary with respect to the motor;
   a first bearing disposed within the first adapter and sized for use with the motor and either the first or the second input shaft, the output shaft rotating within the first bearing;
   a second adapter secured to one of the first or second speed speed reducers and disposed about a portion of the first or second input shaft and secured to the first adapter, the second adapter being stationary with respect to the first adapter;
   a second bearing disposed within the second adapter, the first or second input shaft rotating within the second bearing and coaxial with the output shaft; and
   a connecting assembly connecting the input shaft and the output shaft.

2. The system of claim 1, further comprising a sealing member disposed between the first and second bearings.

3. The system of claim 1, wherein the speed reducer is a two-stage speed reducer.

4. The system of claim 1, wherein the speed reducer is a three-stage speed reducer.

5. The system of claim 1, wherein the connecting assembly includes a coupling and a bushing received between the coupling and the output shaft.

6. The system of claim 1, wherein the first adapter includes an adapter flange configured to fit a mating flange of the motor.

7. The system of claim 1, wherein the second adapter includes an adapter flange configured to fit a mating flange of the speed reducer.

8. A power transmission system, the system comprising:
   a motor having an output shaft;
   a first speed reducer having a first input shaft;
   a second speed reducer having a second input shaft;
   a first adapter secured to the motor and disposed about a portion of the output shaft, the first adapter being stationary with respect to the motor;
   a first bearing disposed within the first adapter, the output shaft rotating within the first bearing, the first bearing being sized for use with the motor and with either the first or the second speed reducer;
   a second adapter securable to the first or the second speed reducer about a portion of the first or the second input shaft;
   a second bearing disposed within the second adapter, the portion of the first or the second input shaft rotating within the second bearing when the second adapter is secured to the first or the second speed reducer, respectively; and
   a connecting assembly for connecting the input shaft to the first or the second speed reducer.

9. The system of claim 8, further comprising a sealing member disposed between the first and second bearings.

10. The system of claim 8, wherein the first speed reducer is a two-stage speed reducer.

11. The system of claim 10, wherein the second speed reducer is a three-stage speed reducer.

12. The system of claim 8, wherein the second adapter is secured to a modular input stage.

13. The system of claim 8, wherein the connecting assembly includes a coupling and a bushing received between the coupling and the output shaft.

14. The system of claim 13, wherein the bushing interfaces with the coupling via splines extending from the bushing.

15. A power transmission assembly for coupling an electric motor to one of a first speed reducer and a second speed reducer, the motor having an output shaft, the first and second speed reducers having first and second input shafts, respectively, the assembly comprising:
   a first adapter assembly configured to be secured to the motor, to remain stationary with the motor, and to surround the output shaft, the first adapter assembly including a first bearing rated for the motor and for either the first or the second speed reducer;
   a second adapter assembly configured to be secured to and to remain stationary with the first or the second speed reducer, the second adapter assembly including a second bearing assembly rated for the speed reducer to which the second adapter is secured; and
   a connecting assembly for connecting the input shaft to the first or the second speed reducer.

16. The assembly of claim 15, further comprising a sealing member disposed between the first and second bearings.

17. The assembly of claim 15, wherein the connecting assembly includes a coupling and a bushing received between the coupling and the output shaft.

18. The assembly of claim 17, wherein the bushing interfaces with the coupling via splines extending from the bushing.

19. The assembly of claim 15, wherein the first adapter includes an adapter flange configured to fit a mating motor flange.

20. The assembly of claim 15, wherein the second adapter includes an adapter flange configured to fit a mating speed reducer flange.

* * * * *